United States Patent Office 2,786,755
Patented Mar. 26, 1957

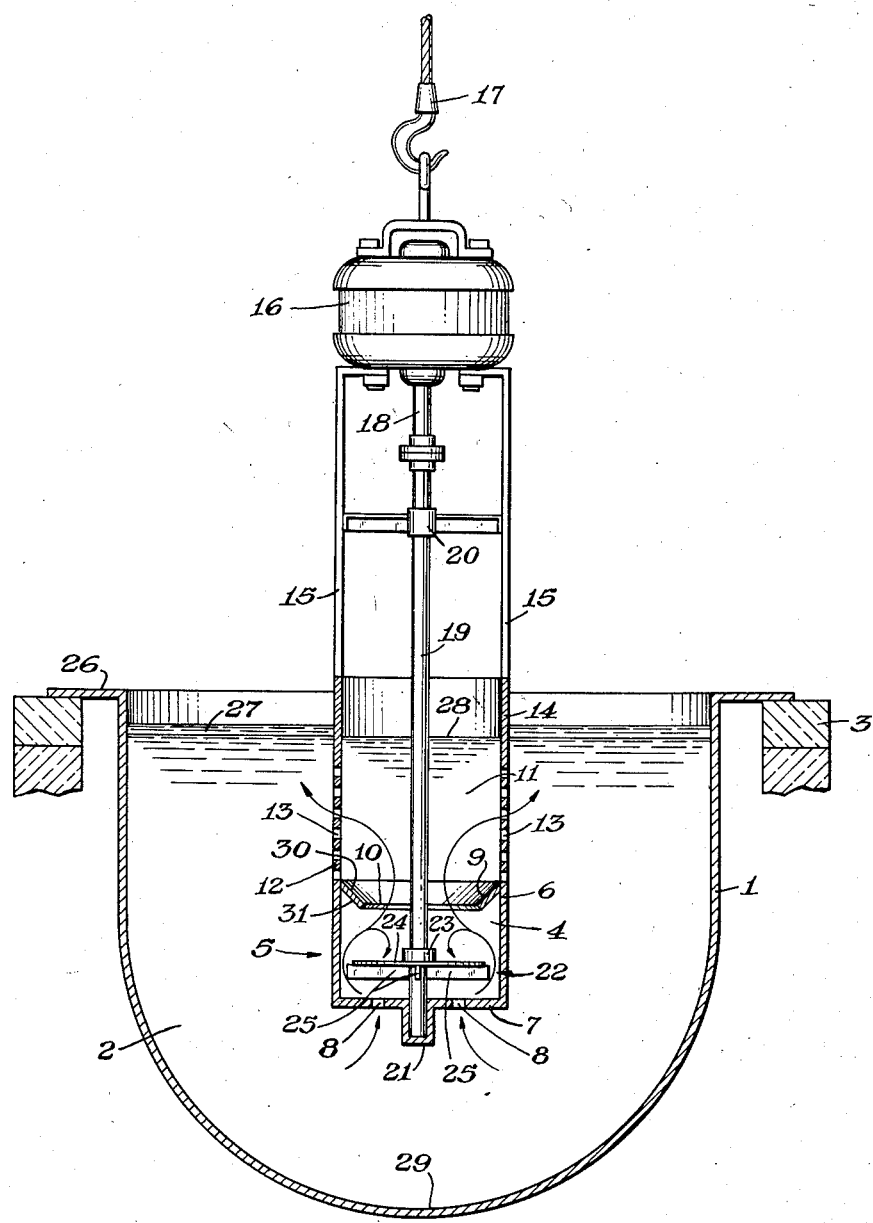

2,786,755

METHOD AND APPARATUS FOR ALLOYING MAGNESIUM

Richard K. Paddock and Frank E. Robbins, Midland, Mich., assignors to The Dow Chemical Company, Midland, Mich., a corporation of Delaware Application August 6, 1952, Serial No. 302,918

5 Claims. (Cl. 75—168)

The invention relates to alloying magnesium and apparatus therefor. It more particularly concerns a method of alloying difficulty alloyable metals with magnesium.

Among the metals which are difficult to alloy with magnesium are manganese and zirconium. These metals remain solid at temperatures to which magnesium is normally heated when alloying it with other metals. At these temperatures, it is difficult with conventional methods to alloy manganese and zirconium with magnesium. As a consequence, it is the usual practice with these metals to introduce them into magnesium by reacting a saline mixture of a reducible compound of either manganese or zirconium with molten magnesium, whereby the reducible metal compound yeilds its metal to the magnesium and thereby becomes alloyed.

A number of disadvantages inure to such practices among which may be mentioned the high cost of the reducible compounds available for the purpose, the difficulty of separating the flux or other saline involved in the operation from the resulting alloy; the loss of magnesium due to its becoming combined with the anionic constituent of the reducible compound used; and the necessity to separate the by-products of the reaction from the resulting alloy. Attempts to alloy the solid elementary metals with molten magnesium have the disadvantages of being time consuming; causing contamination of the melts by flux; and producing a waste of a metal to be alloyed some of which becomes coated with flux and forms a sludge which settles out of the melt.

Insofar as it is now known, there is no satisfactory method commercially available for alloying a relatively high melting point metal with magnesium which does not either consume more or less of the magnesium, contaminate it with flux, or operate inefficiently with regard to consumption of alloying metal. Accordingly, it is the principal object of the invention to provide a method which overcomes these disadvantages. Another object is to provide an apparatus with which the method may be practiced. Other objects and advantages will appear as the description of the invention proceeds.

In accordance with the invention, a relatively large body of molten magnesium, with which the difficulty alloyable metal is to be alloyed, is established as by forming a melt of the metal in a large open top melting pot. A portion of the surface of the molten body of the magnesium is dammed off and the balance covered with foundry flux so as to protect the metal from atmospheric attack. The dammed off portion preferably is centrally located with respect to the sides of the melting pot. Below the dammed off portion of the body of molten magnesium but above the bottom thereof is established a mixing zone and into this zone the metal to be alloyed with the magnesium is introduced and there mixed with the magnesium at the same time molten magnesium from the adjacent molten body thereof is continually introduced from below. Following the mixing step, the resulting alloyed magnesium is moved out of the mixing zone while being separated from unalloyed metal which remains in the mixing zone for further treatment with magnesium until alloyed. The resulting alloyed magnesium is returned to the body of magnesium which thereby becomes alloyed magnesium. The operations of mixing the alloying metal with magnesium, separating the resulting alloy from the unalloyed alloying metal, and returning the alloyed metal to the body of magnesium is continued until the concentration of the added metal in the body of magnesium reaches the desired magnitude.

The invention may be further illustrated by reference to the accompanying drawing, in which is shown a vertical elevation largely in section of apparatus as arranged in carrying out the invention.

In the drawing, there is shown an open top melting vessel 1 adapted to hold a body of molten magnesium 2 with which the difficultly alloyable metal is to be alloyed. The melting pot may be arranged to be supported in a furnace setting 3, partly shown. A mixing zone 4 defined by the mixing chamber 5 having a side wall 6 which may be cylindrical in form and having a diameter about equal to its length and bottom 7 having openings 8 therein providing passageways from the mixing zone to the molten metal body 2. Extending around the inside of the wall 6 is a baffle 9 in the form of an annular ring sloping downwardly and inwardly from the top of the said wall. The baffle has an opening 10 which provides a passageway from the mixing zone 4 to the separating zone 11 directly above the mixing zone. The separating zone 11 is defined as the region within the upstanding screen wall 12, which may be formed of a section of tubing having numerous perforations 13, such as holes $3/16$ inch in diameter, the screen wall being preferably cylindrical and of the same cross section as the side wall 6. The length of the screen wall may be the same as its diameter. Above and joined to the top of the screen wall is a dam member 14 comprising preferably an upstanding section of tubing of the same diameter as the screen wall. Legs 15 extend upwardly from the top of the dam 14 and to their upper ends is secured the motor 16. Attached to the motor are cable means 17 for suspending the mixing chamber and associated parts in the body of molten metal 2, although other means of support may be used. The shaft 18 of the motor 16 is coupled to the drive shaft 19, the upper end of which passes through the guide bearing 20. The lower end is journaled in the bearing 21 which is mounted in the center of the bottom 7. Secured to the shaft 19 within the mixing zone 4 is an impellor 22 comprising a hub 23, disc 24, and vanes 25.

The lengths of the side wall 6 and screen wall 12 together are such that the dam section 14 extends above and below the top 26 of the melting pot a distance sufficient to prevent the flux 27, which is placed upon the molten metal 2, from reaching the portion 28 of the melt's surface through which the metal to be alloyed with magnesium is introduced into the melt, while the bottom 7 is maintained well above the bottom 29 of the melting pot. The distance between the bottom 7 of the mixing zone 4 and the bottom 29 of the melting pot is preferably at least 50 percent greater than the diameter of the mixing zone 4.

In operation, sufficient molten magnesium is used to fill the melting vessel to the level of about the middle of the dam as indicated at 28 and the portion of the upper surface of the molten magnesium outside the dam is covered with a suitable flux, such as magnesium foundry flux, as indicated at 27, to protect this portion of the magnesium from atmospheric attack. A suitable operating temperature is about 1300° to 1450° F., although other temperatures may be used, preferably 1350° to 1400° F. The motor 16 is set into operation so as to revolve the impellor 22 which induces circulation of metal within the mixing zone 4. At the same time, molten metal is drawn by the impellor from the body of molten metal 2 below the mixing zone 4 into the mixing zone 4 from which the mixture therein formed passes through the opening 10 and thence through the screen openings 13 back to the molten metal body 2.

The metal to be alloyed with the magnesium is charged either continuously or preferably periodically in particulated solid form into the separating zone 11 through the flux-free surface 28 within the dam 14. The particulated solid metal thus introduced settles, countercurrent to the upward flowing molten metal in the separating zone 11, into the mixing zone 4. In the mixing zone, the added metal is commingled with molten metal which is recirculated within the zone 4 by impellor 22 while molten metal from the molten metal body 2 is induced to enter the mixing zone 4 through openings 8 by impellor 22. While the commingling of the particulated solid metal with the molten metal proceeds in zone 4 a portion of the resulting liquid alloyed metal is displaced from the mixing zone by the molten metal induced to enter the zone by the impellor and separates from the particulated solids on passing upwardly through the separating zone 11 and the perforation 13 into the molten metal body 2. The upper side 30 of baffle 9 directs the settling particulated solids from zone 11 into the path of the recirculating mixture of particulated metal and molten metal in zone 4, while the underside 31 of the baffle together with the inside of the side wall 6 and inside of the bottom 7 direct the flow of the recirculating mixture of particulated metal and molten metal toward the middle of the upper side of the zone below the opening 10 as indicated by the arrows. Because of the upward circulatory motion of the melt within the dammed off area, i. e. zone 11, there is little, if any, tendency for the molten metal to burn at the surface 28. Hence, no flux need be used over this portion of the molten metal surface. The alloyed body of metal obtained as described may be removed from the melting vessel in any convenient manner as by pumping or bailing.

The method permits the use of a relatively wide range of particle size of the particulated metal, for example particles as large as those passing through a 2 inch square opening to those just small enough to pass through a number 120 standard sieve may be used. In the case of electrolytic manganese, this metal is usually in the form of chips about ⅛ to ¼ inch thick and up to about 2 inches long. In the case of zirconium, this metal is usually in the form of sponge broken into chunks of various sizes.

The following example is illustrative of the practice of the invention.

*Example*

300 pounds of electrolytic magnesium plus a small heel of a previous similar melt is charged into a melting vessel. The metals are heated to 1400° F. under the protection of a thin layer of magnesium foundry flux. A portion of the flux lying on the surface of the melt is swept aside to expose a flux-free molten metal surface and the apparatus illustrated in the drawing is lowered with the cable means 17 into the molten metal through the flux-freed portion of the surface. The apparatus is positioned so that the dam member 14 extends above and below the surface of the molten metal. The flux is allowed to spread over the surface of the melt outside the dam while molten metal enters the openings 8 and 13 and thus fills the space inside the apparatus, as indicated in the drawing. 6 pounds of particulated manganese is charged into the molten metal through the flux-free surface 28 inside the dam 14 and while charging in the particulated manganese the impeller is rotated at about 200 R. P. M. After the charge is introduced, the speed is raised to 300 R. P. M. and the rotation of the impeller is continued at this speed while samples are taken periodically from the molten metal body 2. After 10 minutes, a sample shows a manganese content of 0.95 percent; 10 minutes later, another sample shows a manganese content of 1.77 percent; and 10 minutes later, another sample shows the manganese content of the molten metal body is 2.10 percent. At this stage, the efficiency of the alloying has reached 98.0 percent.

We claim:

1. In an apparatus for alloying with magnesium a metal which remains solid and readily settles in molten magnesium at the melting temperature of magnesium the combination comprising an open top melting pot for holding a body of the molten magnesium to be alloyed; an open top mixing chamber adapted to be submerged within the body of molten magnesium, said chamber comprising an upstanding side wall and bottom, said bottom having openings therethrough permitting the passage of molten metal from the melting pot into the mixing chamber; a separating chamber comprising an upstanding tubular section having its lower edge joined to the top of said upstanding side wall, said upstanding tubular section having perforations therethrough permitting the passage of molten metal from the separating chamber to the melting pot; a dam member comprising an upstanding tubular section having its lower edge joined to the top of the separating chamber; the interior of said mixing chamber, separating chamber, and dam member forming a continuous enclosure for molten metal; support means attached to the dam and extending upwardly therefrom adapted to support a motor above the dam; a motor mounted upon the said support means; a drive shaft extending from the motor to the mixing chamber; and an impeller mounted within the mixing chamber on the drive shaft adapted to circulate molten metal within the mixing chamber and from the melting pot through the mixing chamber and separating chamber to the melting pot.

2. In an apparatus according to claim 1, a baffle comprising an annular ring having its outer edge joined to the inside of the mixing chamber at the top, said baffle sloping downwardly and inwardly from its outer edge.

3. The method of alloying a difficulty alloyable metal with molten magnesium at a temperature at which the difficultly alloyable metal remains unmelted and readily settles in molten magnesium the steps which comprise maintaining a body of the magnesium in the melted state; isolating a portion of the molten magnesium within the body thereof and subjecting it to agitation so as to circulate the portion upon itself; continuously transferring from the body of the molten magnesium to the isolated portion a stream of the said body of molten magnesium so as to continuously displace molten metal from the isolated portion while circulating the isolated portion upon itself; transferring the displaced molten metal to a separating zone; introducing into the separating zone the difficulty alloyable metal in particulated form and allowing the same to fall through the said zone into the mixing zone while said displaced molten metal rises therethrough; separating the resulting upward flow of molten metal from the descending particulated metal; and returning the separated molten metal to the aforesaid body thereof.

4. The method according to claim 3 in which the difficultly alloyable metal is electrolytic manganese.

5. The method according to claim 3 in which the difficultly alloyable metal is zirconium sponge.

References Cited in the file of this patent

UNITED STATES PATENTS

| | | |
|---|---|---|
| 1,386,503 | Hulst et al. | Aug. 2, 1921 |
| 1,942,202 | Cohn | Jan. 2, 1934 |
| 2,005,540 | Fleming et al. | June 18, 1935 |
| 2,038,221 | Kagi | Apr. 21, 1936 |
| 2,195,902 | Muller et al. | Mar. 26, 1940 |
| 2,452,894 | Ball et al. | Nov. 2, 1948 |
| 2,472,757 | Peake | June 7, 1949 |
| 2,497,529 | Ball et al. | Feb. 14, 1950 |
| 2,585,404 | Pierce | Feb. 12, 1952 |